United States Patent
Pandit et al.

(10) Patent No.: US 10,291,863 B2
(45) Date of Patent: May 14, 2019

(54) METHOD FOR INDICATING CODING ORDER IN MULTI-VIEW VIDEO CODED CONTENT

(75) Inventors: Purvin Bibhas Pandit, Franklin Park, NJ (US); Yeping Su, Camas, WA (US); Peng Yin, West Windsor, NJ (US)

(73) Assignee: InterDigital VC Holdings Inc., Wilmington, DE (US)

(*) Notice: Subject to any disclaimer, the term of this patent is extended or adjusted under 35 U.S.C. 154(b) by 129 days.

(21) Appl. No.: 12/312,953

(22) PCT Filed: Dec. 6, 2007

(86) PCT No.: PCT/US2007/024986
§ 371 (c)(1),
(2), (4) Date: Jun. 2, 2009

(87) PCT Pub. No.: WO2008/088497
PCT Pub. Date: Jul. 24, 2008

(65) Prior Publication Data
US 2010/0091881 A1  Apr. 15, 2010

Related U.S. Application Data

(60) Provisional application No. 60/871,401, filed on Dec. 21, 2006.

(51) Int. Cl.
*H04N 7/12* (2006.01)
*H04N 11/02* (2006.01)
(Continued)

(52) U.S. Cl.
CPC ......... *H04N 5/2628* (2013.01); *H04N 19/577* (2014.11); *H04N 19/597* (2014.11); *H04N 19/61* (2014.11); *H04N 19/70* (2014.11)

(58) Field of Classification Search
CPC . H04B 1/66; H04N 7/12; H04N 11/02; H04N 11/04; H04N 7/24; H04N 7/26;
(Continued)

(56) References Cited

U.S. PATENT DOCUMENTS 5,886,736 A    3/1999  Chen
7,782,943 B2 * 8/2010  Jeon et al. ............... 375/240.12
(Continued)

FOREIGN PATENT DOCUMENTS

TW         349311      1/1999
TW       200531555     9/2005
(Continued)

OTHER PUBLICATIONS

Pandit, et al., High level syntax changes for MVC, Joint Video Team (JVT) of ISO/IEC MPEPG & ITU-T VCEG (ISO/IEC JTC1/SC29/WG11 and ITU-T SG16 Q.6) 22$^{nd}$ Meeting Marrakech,Morocco, Jan. 13-19, 2006 JVT-V054.*

(Continued)

*Primary Examiner* — Jessica M Prince
(74) *Attorney, Agent, or Firm* — Brian J. Dorini; Xiaoan Lu (57) ABSTRACT

There are provided methods and apparatus for improved signaling using high level syntax for multi-view video coding and decoding. An apparatus includes an encoder for encoding at least one picture for at least one view corresponding to multi-view video content in a resultant bitstream, wherein said encoder signals video coding order information for at least the at least one picture in a high level syntax.

12 Claims, 7 Drawing Sheets

(51) Int. Cl.
*H04N 5/262* (2006.01)
*H04N 19/597* (2014.01)
*H04N 19/70* (2014.01)
*H04N 19/61* (2014.01)
*H04N 19/577* (2014.01)

(58) Field of Classification Search
CPC .... H04N 19/577; H04N 19/597; H04N 19/61; H04N 19/70; H04N 5/2628
USPC ........................ 375/130–153, 240.01–240.29; 704/500–504
IPC ............... H04B 1/66; H04N 7/12,11/02, 11/04, 7/24, 7/26
See application file for complete search history.

(56) References Cited

U.S. PATENT DOCUMENTS

| | | | | |
|---|---|---|---|---|
| 8,165,216 | B2* | 4/2012 | Chen et al. | 375/240.24 |
| 8,335,265 | B2 | 12/2012 | Hannuksela et al. | |
| 2003/0202592 | A1 | 10/2003 | Sohn et al. | |
| 2006/0165232 | A1 | 7/2006 | Burazerovic et al. | |
| 2006/0245516 | A1 | 11/2006 | Simon | |
| 2007/0258652 | A1 | 11/2007 | Kazui et al. | |
| 2008/0137742 | A1* | 6/2008 | Chen | H04N 19/597 375/240.13 |
| 2009/0238269 | A1* | 9/2009 | Pandit et al. | 375/240.12 |

FOREIGN PATENT DOCUMENTS

| | | |
|---|---|---|
| WO | WO2006072993 | 7/2006 |
| WO | WO2006110007 | 10/2006 |

OTHER PUBLICATIONS

Lifen et al.: "The Performance Study of Transmitting MPEG4 Over SCTP," IEEE Int'l. Conference on Neural Networks & Signal Processing, Nanjing, China, Dec. 14-17, 2003, pp. 1639-1642, XP0010691835.

Shim et al.: "High Level Syntax for Flexible I-Frame Position," Joint Video Team (JVT) of ISO/IEC MPEG & ITU-T VCEG, Document: JVT-U046, Oct. 20-27, 2006, pp. 1-16, Samsung Electronics Co., LTD, Korea, XP0030006692.

Vetro et al.: "Joint Multiview Video Model (JMVM) 1.0,)," Joint Video Team (JVT) of ISO/IEC MPEG & ITU-T VCEG, Document: JVT-T208, Jul. 15-21, 2006, pp. 1-23, XP002485056.

Vetro et al.: "Joint Draft 1.0 on Multiview Video Coding," Joint Video Team (JVT) of ISO/IEC MPEG & ITU-T VCEG, Document:JVT-U209, Oct. 20-27, 2006, pp. 1-20.

International Search Report, dated Sep. 10, 2008.

Pandit et al., "High Level Syntax Changes for MVC", Joint Video Team (JVT) of ISO/IEC MPEG & ITU-T VCEG, 22nd Meeting, Marrakech, Morocco, Jan. 13-19, 2006, JVT-V054.

Pandit et al., "MVC High Level Syntax Changes for MVC", Joint Video Team (JVT) of ISO/IEC MPEG & ITU-T VCEG, 22nd Meeting, Marrakech, Morocco, Jan. 13-19, 2007.

* cited by examiner

METHOD FOR INDICATING CODING ORDER IN MULTI-VIEW VIDEO CODED CONTENT

CROSS-REFERENCE TO RELATED APPLICATIONS

This application is a National Stage Application and claims the benefit, under 35 U.S.C. § 365 of International Application PCT/US2007/024986 filed Dec. 6, 2007 which was published in accordance with PCT Article 21(2) on Jul. 24, 2008 in English, and which claims the benefit of U.S. Provisional Patent Application No. 60/871,401 filed on Dec. 21, 2006.

TECHNICAL FIELD

The present principles relate generally to video encoding and decoding and, more particularly, to methods and apparatus for improved signaling using high level syntax for multi-view video coding and decoding.

BACKGROUND

In the current version of multi-view video coding (MVC) extension based on the International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 recommendation (hereinafter the "MPEG-4 AVC standard"), new syntax is added in the sequence parameter set MVC extension to signal the inter-view references. That is, this syntax is used to indicate the inter-view references to be used for anchor and non-anchor pictures.

This syntax can also serve the purpose of building the view dependency map, which can be used for view random access, an implicit decoded reference picture marking process, and so forth. The syntax is defined by looping the variable view_id from 0 to number of views minus 1. view_id indicates the view identifier for a view. It does not include any coding order information.

This definition puts some restriction on how to assign view_id for each view. The definition does not allow gaps in view_ids. If later, some views are not coded, the definition will cause some ambiguity. In addition, this definition lacks some features. For example, the definition does not specify the coding order of each view.

TABLE 1 illustrates the sequence parameter set (SPS) Multi-view Video Coding (MVC) extension syntax.

TABLE 1

| seq_parameter_set_mvc_extension( ) { | C | Descriptor |
|---|---|---|
| num_views_minus_1 | | ue(v) |
| for(i = 0; i <= num_views_minus_1; i++) { | | |
| num_anchor_refs_l0[i] | | ue(v) |
| for( j = 0; j < num_anchor_refs_l0[i]; j++ ) | | |
| anchor_ref_l0[i][j] | | ue(v) |
| num_anchor_refs_l1[i] | | ue(v) |
| for( j = 0; j < num_anchor_refs_l1[i]; j++ ) | | |
| anchor_ref_l1[i][j] | | ue(v) |
| } | | |
| for(i = 0; i <= num_views_minus_1; i++) { | | |
| num_non_anchor_refs_l0[i] | | ue(v) |
| for( j = 0; j < num_non_anchor_refs_l0[i]; j++ ) | | |
| non_anchor_ref_l0[i][j] | | ue(v) |

TABLE 1-continued

| seq_parameter_set_mvc_extension( ) { | C | Descriptor |
|---|---|---|
| num_non_anchor_refs_l1[i] | | ue(v) |
| for( j = 0; j < num_non_anchor_refs_l1[i]; j++ ) | | |
| non_anchor_ref_l1[i][j] | | ue(v) |
| } | | |
| } | | |

The semantics of the syntaxes in TABLE 1 are defined as follows:

num_views_minus_1 plus 1 identifies the total number of views in the bitstream. The value of the number_of_view_minus_1 shall be in the range of 0 to 1023.

num_anchor_refs_l0[i] specifies the number of inter-view prediction references for list0 for anchor pictures with view_id equal to i. The value of num_anchor_refs_l0[i] shall be less than or equal to num_ref_frames.

anchor_ref_l0[i][j] identifies the view_id of the view that is used as the jth reference of list0, for anchor pictures of the view with view_id equal to i.

num_anchor_refs_l1 [i] specifies the number of inter-view prediction references for list1 of the anchor picture with view_id equal to i. The value of num_anchor_refs l1 [i] shall be less than or equal to num_ref_frames.

anchor_ref_l1[i][j] identifies the view_id of the view that is used as the jth reference of list1, for anchor pictures of the view with view_id equal to i.

num_non_anchor_refs_l0[i] specifies the number of inter-view prediction references for list0 for non-anchor pictures with view_id equal to i. The value of num_non_anchor_refs_l0[i] shall be less than or equal to num_ref_frames.

non_anchor_ref_l0[i][j] identifies the view_id of the view that is used as the jth reference of list0, for non-anchor pictures of the view with view_id equal to i.

num_non_anchor_refs_l1[i] specifies the number of inter-view prediction references for list1 for non-anchor pictures with view_id equal to i. The value of num_non_anchor_refs_ l1[i] shall be less than or equal to num_ref_frames.

non_anchor_ref_l1[i][j] identifies the view_id of the view that is used as the jth reference of list1, for non-anchor pictures of the view with view_id equal to i.

The following procedure shall be conducted to place reference pictures from a view that is different from the current view into the reference prediction lists. If the current picture is an anchor picture, then for each value of i from 0 to num_anchor_refs_IX−1, the picture with view_id equal to anchor_ref_IX[i] and with the same PicOrderCnt( ) as the current picture shall be appended to RefPicListX. Otherwise, if the current picture is not an anchor picture, then for each value of i from 0 to num_non_anchor_refs_IX−1, the picture with view_id equal to non_anchor_ref_IX[i] and with the same PicOrderCnt( ) as the current picture shall be appended to RefPicListX.

From TABLE 1, it can be seen that the syntax in the sequence parameter set (SPS) of the Multi-view Video Coding (MVC) extension is defined by looping over the variable view_id from 0 to number of views minus 1. This definition puts some restriction on how to assign view_id for each view. The definition does not allow gaps in view_ids. If later, due to some reason(s), such as bandwidth limitation or a user's interest, some views are not coded, this definition will cause some ambiguity. To keep the continuity of view_id assignment, the following can be implemented.

In a first prior art method for keeping the continuity of view_id assignment, un-coded view information in maintained in the sequence parameter set and the number of inter-view references is set to 0. However, this is not desirable as the decoder will not know if the un-coded view is intentionally missing or due to transmission errors.

In a second prior art method for keeping the continuity of view_id assignment, the un-coded view information is removed from the sequence parameter set. However, this will cause view_id gaps. Thus, view_ids have to be re-assigned. This is also not desirable since view_id is no longer unique to each view.

SUMMARY

These and other drawbacks and disadvantages of the prior art are addressed by the present principles, which are directed to methods and apparatus for improved signaling using high level syntax for multi-view video coding and decoding.

According to an aspect of the present principles, there is provided an apparatus. The apparatus includes an encoder for encoding at least one picture for at least one view corresponding to multi-view video content in a resultant bitstream, wherein said encoder signals video coding order information for at least the at least one picture in a high level syntax.

According to another aspect of the present principles, there is provided a method. The method includes encoding at least one picture for at least one view corresponding to multi-view video content in a resultant bitstream, wherein said encoding step comprises signaling video coding order information for at least the at least one picture in a high level syntax.

According to yet another aspect of the present principles, there is provided an apparatus. The apparatus includes a decoder for decoding at least one picture for at least one view corresponding to multi-view video content in a resultant bitstream, wherein said decoder determines video coding order information for at least the at least one picture from a high level syntax.

According to a further aspect of the present principles, there is provided a method. The method includes decoding at least one picture for at least one view corresponding to multi-view video content in a resultant bitstream, wherein said decoding step comprises determining video coding order information for at least the at least one picture from a high level syntax.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

The present principles are directed to methods and apparatus for improved signaling using high level syntax for multi-view video coding and decoding.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles means that a particular feature, structure, characteristic, and so forth described in connection with the embodiment is included in at least one embodiment of the present principles. Thus, the appearances of the phrase "in one embodiment" or "in an embodiment" appearing in various places throughout the specification are not necessarily all referring to the same embodiment.

As used herein, "high level syntax" refers to syntax present in the bitstream that resides hierarchically above the macroblock layer. For example, high level syntax, as used herein, may refer to, but is not limited to, syntax at the slice header level, the sequence parameter set (SPS) level, the picture parameter set (PPS) level, the view parameter set (VPS) level, the network abstraction layer (NAL) unit header level, and in a supplemental enhancement information (SEI) message.

For the sake of illustration and brevity, the following embodiments are described herein with respect to the use of a high level syntax in the sequence parameter set. However, it is to be appreciated that the present principles are not limited to solely the use of the sequence parameter set with respect to the improved signaling disclosed herein and, thus, such improved signaling may be implemented with respect to at least the above-described types of high level syntaxes including, but not limited to, syntaxes at the slice header level, the sequence parameter set (SPS) level, the picture parameter set (PPS) level, the view parameter set (VPS) level, the network abstraction layer (NAL) unit header level, and in a supplemental enhancement information (SEI) message, while maintaining the spirit of the present principles.

It is to be further appreciated that while one or more embodiments of the present principles are described herein with respect to the Multi-view extension of the MPEG-4 AVC standard, the present principles are not limited to solely this standard and, thus, may be utilized with respect to other video coding standards, recommendations, and extensions thereof, including extensions of the Multi-view extension of the MPEG-4 AVC standard, while maintaining the spirit of the present principles.

Moreover, it is to be appreciated that the use of the term "and/or", for example, in the case of "A and/or B", is intended to encompass the selection of the first listed option (A), the selection of the second listed option (B), or the selection of both options (A and B). As a further example, in the case of "A, B, and/or C", such phrasing is intended to encompass the selection of the first listed option (A), the selection of the second listed option (B), the selection of the third listed option (C), the selection of the first and the second listed options (A and B), the selection of the first and third listed options (A and C), the selection of the second and third listed options (B and C), or the selection of all three options (A and B and C). This may be extended, as readily apparent by one of ordinary skill in this and related arts, for as many items listed.

Figure 1:
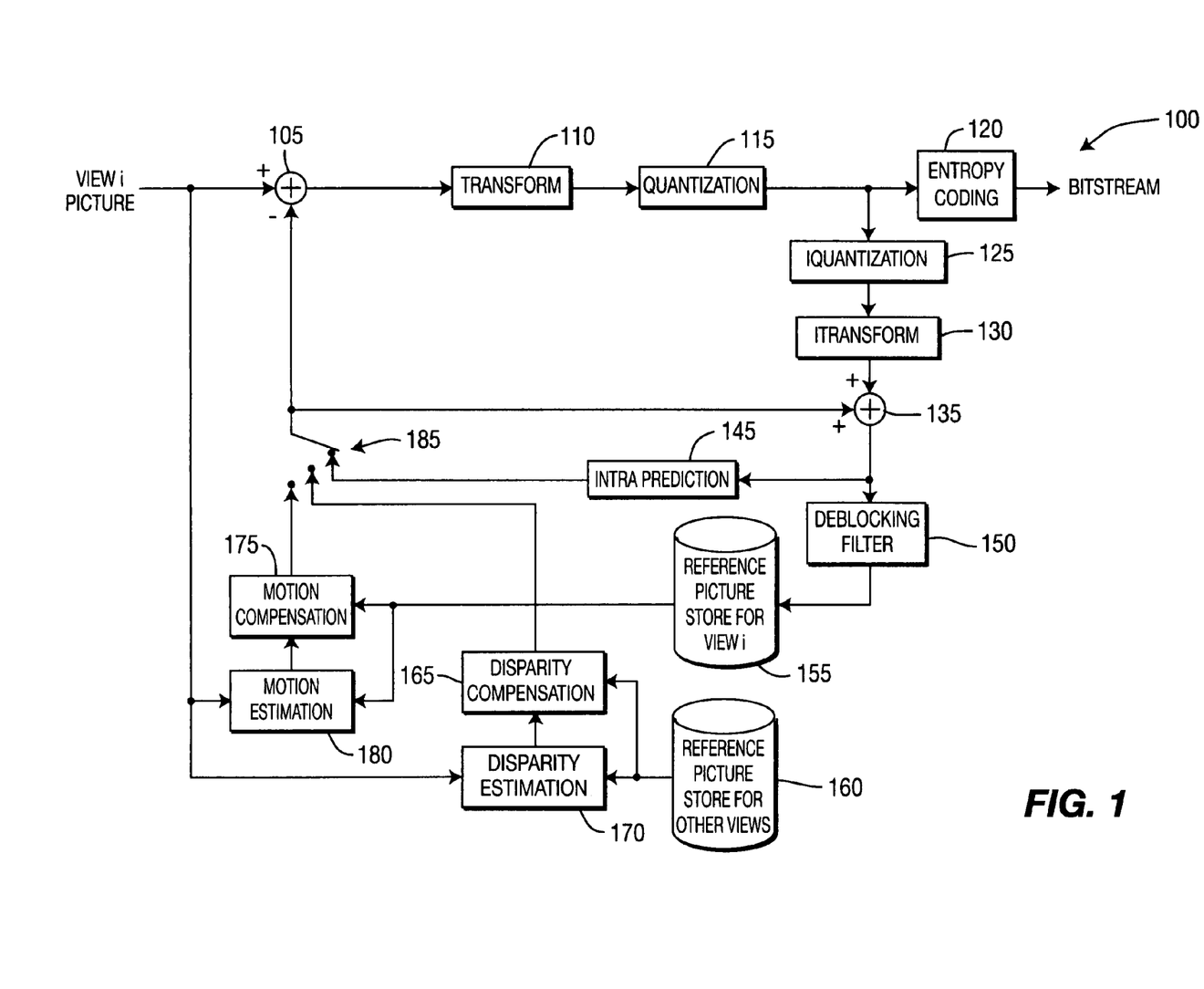
FIG. 1 is a block diagram for an exemplary Multi-view Video Coding (MVC) encoder to which the present principles may be applied, in accordance with an embodiment of the present principles.

Turning to FIG. 1, an exemplary Multi-view Video Coding (MVC) encoder is indicated generally by the reference numeral 100. The encoder 100 includes a combiner 105 having an output connected in signal communication with an input of a transformer 110. An output of the transformer 110 is connected in signal communication with an input of quantizer 115. An output of the quantizer 115 is connected in signal communication with an input of an entropy coder 120 and an input of an inverse quantizer 125. An output of the inverse quantizer 125 is connected in signal communication with an input of an inverse transformer 130. An output of the inverse transformer 130 is connected in signal communication with a first non-inverting input of a combiner 135. An output of the combiner 135 is connected in signal communication with an input of an intra predictor 145 and an input of a deblocking filter 150. An output of the deblocking filter 150 is connected in signal communication with an input of a reference picture store 155 (for view i). An output of the reference picture store 155 is connected in signal communication with a first input of a motion compensator 175 and a first input of a motion estimator 180. An output of the motion estimator 180 is connected in signal communication with a second input of the motion compensator 175

An output of a reference picture store 160 (for other views) is connected in signal communication with a first input of a disparity estimator 170 and a first input of a disparity compensator 165. An output of the disparity estimator 170 is connected in signal communication with a second input of the disparity compensator 165.

An output of the entropy decoder 120 is available as an output of the encoder 100. A non-inverting input of the combiner 105 is available as an input of the encoder 100, and is connected in signal communication with a second input of the disparity estimator 170, and a second input of the motion estimator 180. An output of a switch 185 is connected in signal communication with a second non-inverting input of the combiner 135 and with an inverting input of the combiner 105. The switch 185 includes a first input connected in signal communication with an output of the motion compensator 175, a second input connected in signal communication with an output of the disparity compensator 165, and a third input connected in signal communication with an output of the intra predictor 145.

Figure 2:
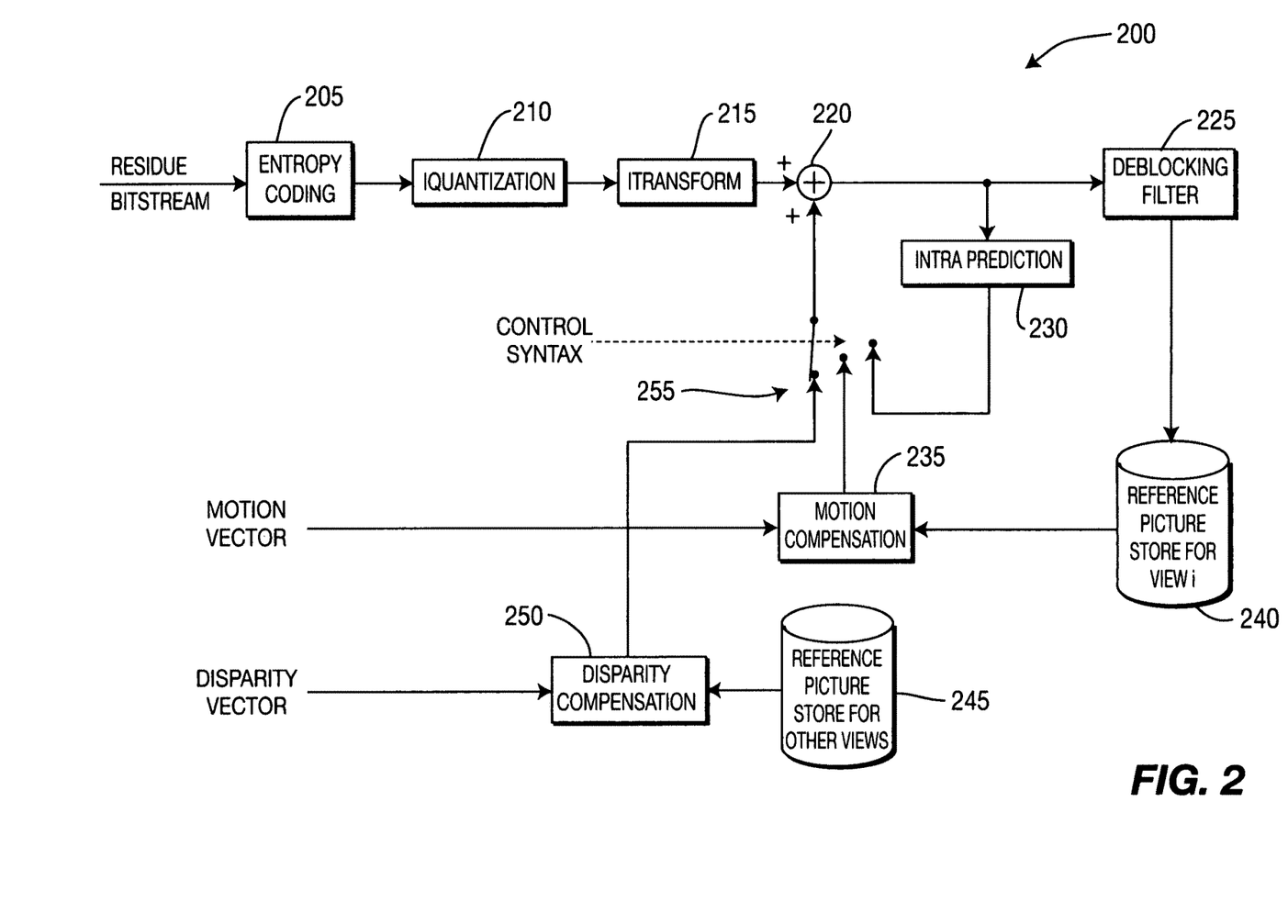
FIG. 2 is a block diagram for an exemplary Multi-view Video Coding (MVC) decoder to which the present principles may be applied, in accordance with an embodiment of the present principles.

Turning to FIG. 2, an exemplary Multi-view Video Coding (MVC) decoder is indicated generally by the reference numeral 200. The decoder 200 includes an entropy decoder 205 having an output connected in signal communication with an input of an inverse quantizer 210. An output of the inverse quantizer is connected in signal communication with an input of an inverse transformer 215. An output of the inverse transformer 215 is connected in signal communication with a first non-inverting input of a combiner 220. An output of the combiner 220 is connected in signal communication with an input of a deblocking filter 225 and an input of an intra predictor 230. An output of the deblocking filter 225 is connected in signal communication with an input of a reference picture store 240 (for view i). An output of the reference picture store 240 is connected in signal communication with a first input of a motion compensator 235.

An output of a reference picture store 245 (for other views) is connected in signal communication with a first input of a disparity compensator 250.

An input of the entropy coder 205 is available as an input to the decoder 200, for receiving a residue bitstream. Moreover, a control input of the switch 255 is also available as an input to the decoder 200, for receiving control syntax to control which input is selected by the switch 255. Further, a second input of the motion compensator 235 is available as an input of the decoder 200, for receiving motion vectors. Also, a second input of the disparity compensator 250 is available as an input to the decoder 200, for receiving disparity vectors.

An output of a switch 255 is connected in signal communication with a second non-inverting input of the combiner 220. A first input of the switch 255 is connected in signal communication with an output of the disparity compensator 250. A second input of the switch 255 is connected in signal communication with an output of the motion compensator 235. A third input of the switch 255 is connected in signal communication with an output of the intra predictor 230. An output of the mode module 260 is connected in signal communication with the switch 255 for controlling which input is selected by the switch 255. An output of the deblocking filter 225 is available as an output of the decoder.

In accordance with the present principles, methods and apparatus are provided for improved signaling using high level syntax for multi-view video coding and decoding.

As noted above, the current multi-view video coding extension of the MPEG-4 AVC Standard includes syntax that signals inter-view references. However, as further noted above, the syntax definition lacks some features. For example, the syntax definition does not specify the coding order of each view. This information is very useful for error resiliency. If defined properly, it can help the decoder to detect that some pictures in certain views were missing and the decoder would be able to conceal the lost picture in certain views without losing track of what was going on.

Figure 3:
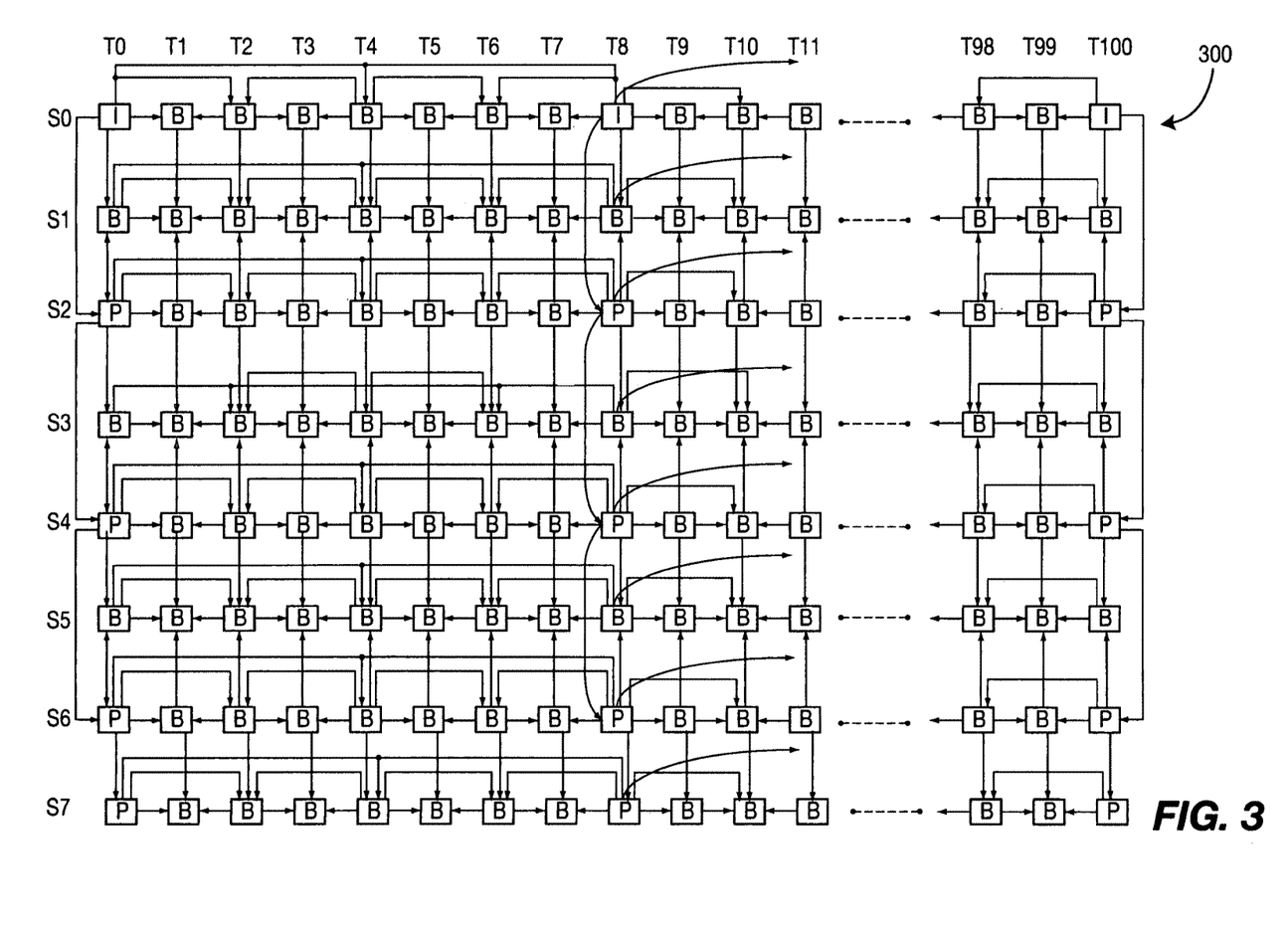
FIG. 3 is a diagram for a time-first coding structure for a multi-view video coding system with 8 views to which the present principles may be applied, in accordance with an embodiment of the present principles.

Turning to FIG. 3, a time-first coding structure for a multi-view video coding system with 8 views is indicated generally by the reference numeral 300. In the example of FIG. 3, all pictures at the same time instance from different views are coded contiguously. Thus, if we know coding order information, then we can quickly detect which view is lost at one time instant by tracking the view_id. This information can also help speed up the construction of the dependency map. For example, earlier coded views will not use later coded views as references. The dependency map may be used for, for example, random access, an implicit decoded reference picture marking process, and so forth.

In order to construct dependency map information from the current view dependency information in the sequence parameter set, a recursive call may be used. In the following example, the indication of an anchor/non-anchor picture is dropped since the algorithm is applicable to both.

We propose constructing picture_dependency_maps[i][j] with the following semantics:
picture_dependency_maps[i][j] equal to 1 indicates the picture with view_id equal to j will depend on the picture with view_id equal to i.

It is presumed that we are using static data structures. It is desirable to obtain the following information in order to build the picture_dependency_maps:
    num_refs[k], indicating number of inter-view references for the view with view_id equals to k
    The list of view_id's that are referred to by the view with view_id equal to k: refs[k][l] where l is looped from 0 to num_refs[k]−1.

```
// picture_dependency_maps[N][N], num_refs[N], refs[N][N] are global
build_picture_dependency_maps( )
{
  int p, q;
  for (p=0; p<N; p++)
    for (q=0; q<N; q++)
      picture_dependency_maps[p][q] = 0;
  for (p=0; p<N; p++)
  {
    for (q=0; q<num_refs[p]; q++)
      add_dep(refs[p][q], p);
  }
}
add_dep(m, n)
{
  int p, q;
  picture_dependency_map[m][n] = 1;
  if (num_refs[m] == 0)
    return;
  for (p=0; p<num_refs[m]; p++)
    add_dep(refs[m][p], n);
}
```

In accordance with various embodiments of the present principles, we propose improvements to the existing sequence parameter set (SPS) in the multi-view video coding (MVC) extension of the MPEG-4 AVC Standard. The improved sequence parameter set can indicate view coding order information and allow flexible view identifier (view_id) assignment. It is considered flexible since the view identifier (view_id) is explicitly sent in the high level syntax instead of treating the loop variable as the view identifier. Of course, as noted above, while the present principles are primarily described herein with respect to the implementation of improvements to the existing sequence parameter set in the multi-view video coding extension of the MPEG-4 AVC Standard, such signaling improvements relating to indicating view coding order information and allowing flexible view identifier (view_id) assignment is not limited to solely the sequence parameter set and may be implemented by a high level syntax at the slice header level, the picture parameter set (PPS) level, the view parameter set (VPS) level, the network abstraction layer (NAL) unit header level, and in a supplemental enhancement information (SEI) message, while maintaining the spirit of the present principles.

A description will now be given regarding an embodiment of the present principles.

TABLE 2 shows the proposed sequence parameter set multi-view video coding (MVC) extension syntax in accordance with the embodiment.

TABLE 2

| seq_parameter_set_mvc_extension( ) { | C | Descriptor |
|---|---|---|
|   num_views_minus_1 | | ue(v) |
|   for(i = 0; i <= num_views_minus_1; i++) | | |
|     view_id[i] | | ue(v) |
|   for(i = 0; i <= num_views_minus_1; i++) { | | |
|     num_anchor_refs_l0[i] | | ue(v) |
|     for( j = 0; j < num_anchor_refs_l0[i]; j++ ) | | |
|       anchor_ref_l0[i][j] | | ue(v) |
|     num_anchor_refs_l1[i] | | ue(v) |
|     for( j = 0; j < num_anchor_refs_l1[i]; j++ ) | | |
|       anchor_ref_l1[i][j] | | ue(v) |
|   } | | |
|   for(i = 0; i <= num_views_minus_1; i++) { | | |
|     num_non_anchor_refs_l0[i] | | ue(v) |
|     for( j = 0; j < num_non_anchor_refs_l0[i]; j++ ) | | |
|       non_anchor_ref_l0[i][j] | | ue(v) |
|     num_non_anchor_refs_l1[i] | | ue(v) |

TABLE 2-continued

| seq_parameter_set_mvc_extension( ) { | C | Descriptor |
|---|---|---|
|     for( j = 0; j < num_non_anchor_refs_l1[i]; j++ ) | | |
|         non_anchor_ref_l1[i][j] | | ue(v) |
|   } | | |
| } | | |

In the embodiment, we propose to use the loop variable i to indicate view coding order. The loop variable i is always incremented for each view. Thus, the view coding order number is unique for each view.

As noted above, the prior art indicates the loop variable i as view_id and loops from 0 to num_view_minus_1. In contrast, we use the loop variable i as the view coding order and loop from 0 to num_view_minus_1. Additionally, we signal the view_id inside the loop. Thus, we can assign any view_id to the views and are not restricted to the loop variable as is the case in the current multi-view video coding extension of the MPEG-4 AVC Standard. The semantics of the syntaxes are redefined as:

num_views_minus_1 plus 1 identifies the total number of coded views in the bitstream. The value of the number_of_view_minus_1 shall be in the range of 0 to 1023.

view_id[i] specifies the view_id of the view with coding order indicate by i.

num_anchor_refs_l0[i] specifies the number of inter-view prediction references for list0 for anchor pictures with view_id equal to view_id[i]. The value of num_anchor_refs_l0[i] shall be less than or equal to num_ref_frames.

anchor_ref_l0[i][j] identifies the view_id of the view that is used as the jth reference of list0, for anchor pictures of the view with view_id equal to view_id[i].

num_anchor_refs_l1[i] specifies the number of inter-view prediction references for list1 of the anchor picture with view_id equal to view_id[i]. The value of num_anchor_refs l1[i] shall be less than or equal to num_ref_frames.

anchor_ref_l1 [i][j] identifies the view_id of the view that is used as the jth reference of list1, for anchor pictures of the view with view_id equal to view_id[i].

num_non_anchor_refs_l0[i] specifies the number of inter-view prediction references for list0 for non-anchor pictures with view_id equal to view_id[i]. The value of num_non_anchor_refs l0[i] shall be less than or equal to num_ref_frames.

non_anchor_ref_l0[i][j] identifies the view_id of the view that is used as the jth reference of list0, for non-anchor pictures of the view with view_id equal to view_id[i].

num_non_anchor_refs_l1[i] specifies the number of inter-view prediction references for list1 for non-anchor pictures with view_id equal to view_id[i]. The value of num_non_anchor_refs l1[i] shall be less than or equal to num_ref_frames.

non_anchor_ref_l1[i][j] identifies the view_id of the view that is used as the jth reference of list1, for non-anchor pictures of the view with view_id equal to view_id[i].

The advantage of the embodiment is that view_ids that are assigned to views do not have any restriction except for their range as defined in the semantics. The current specification of the multi-view video coding extension always starts the view_ids from 0 and increments by 1. By explicitly sending the view_id, this restriction is no longer needed in implementation in accordance with the present principles.

During the decoding process, a picture may or may not require inter-view reference pictures. To determine the required inter-view reference pictures for a certain picture, the following steps are carried out in accordance with an embodiment of the present principles: (1) read the view_id of current picture from NAL unit header; (2) search for this view_id in the view_id[ ] array of the SPS (This array has the view_id stored in the coding order. Thus, the index of this array indicates the coding order.); (3) determine the index (i) of the current picture's view_id, this is the coding order number; and (4) use this index value (i) to index into the other arrays of the sequence parameter set to determine the inter-view references needed for the current picture.

The present principles are also useful in order to determine if a picture is lost during transmission. This can be done as follows. In the current specification of the multi-view video coding (MVC) extension, we know that time-first coding is done. Before decoding starts for a particular time instance, we can set a counter view_num to 0. For each picture that is received for this time instance, we increment the view_num value. Before we begin decoding this picture, we index into the view_id[view_num] array of the sequence parameter set using the view_num counter. We determine the view_id corresponding to this index. If this view_id is the same as the current picture's view_id, then there is no loss. However, if these view_id's are different, then we know that the indexed view_id was lost. This picture can then be concealed by an appropriate error concealment algorithm. We can also know how many views are lost by incrementing view_id until we hit (match) the current picture's view_id.

For the example of FIG. 3, the view_id is assigned incrementally from the top downward. The mapping between view_num and view_id is as following:

| | view_num | | | | | | | |
|---|---|---|---|---|---|---|---|---|
| | 0 | 1 | 2 | 3 | 4 | 5 | 6 | 7 |
| view_id | 0 | 2 | 1 | 4 | 3 | 6 | 5 | 7 |

The construction of dependency map information from the current view dependency information could be simplified with the coding order available. In the following example, the indication of an anchor/non-anchor is dropped since the algorithm applies for both.

It is presumed that we are using static data structures. It is desirable to have the following information in order to build the picture_dependency_maps:

num_refs[k], indicating number of inter-view references for the view with view_id equals to k     The list of view_id's that are referred by the view with view_id equals to k: refs[k][l] where l is looped from 0 to num_refs[k]−1 view_in_coding_order[k], indicating the list of view_id in the coding order

```
// picture_dependency_maps[N][N],  view_in_coding_order[N],
num_refs[N], refs[N][N] are global
build_picture_dependency_maps_in_order( )
{
  int p, q, pp, s;
  for (p=0; p<N; p++)
    for (q=0; q<N; q++)
      picture_dependency_maps[p][q] = 0;
  for (p=0; p<N; p++)
  {
    pp = view_in_coding_order[p];
    for (q=0; q<num_refs[pp]; q++)
    {
```

-continued

```
    for (s=0; s<N; s++)
      if (picture_dependency_maps[s][ refs[pp][q] ])
         picture_dependency_maps[s][pp] = 1;
      picture_dependency_maps[ refs[pp][q] ][pp] = 1;
    }
   }
 }
}
```

Figure 4:
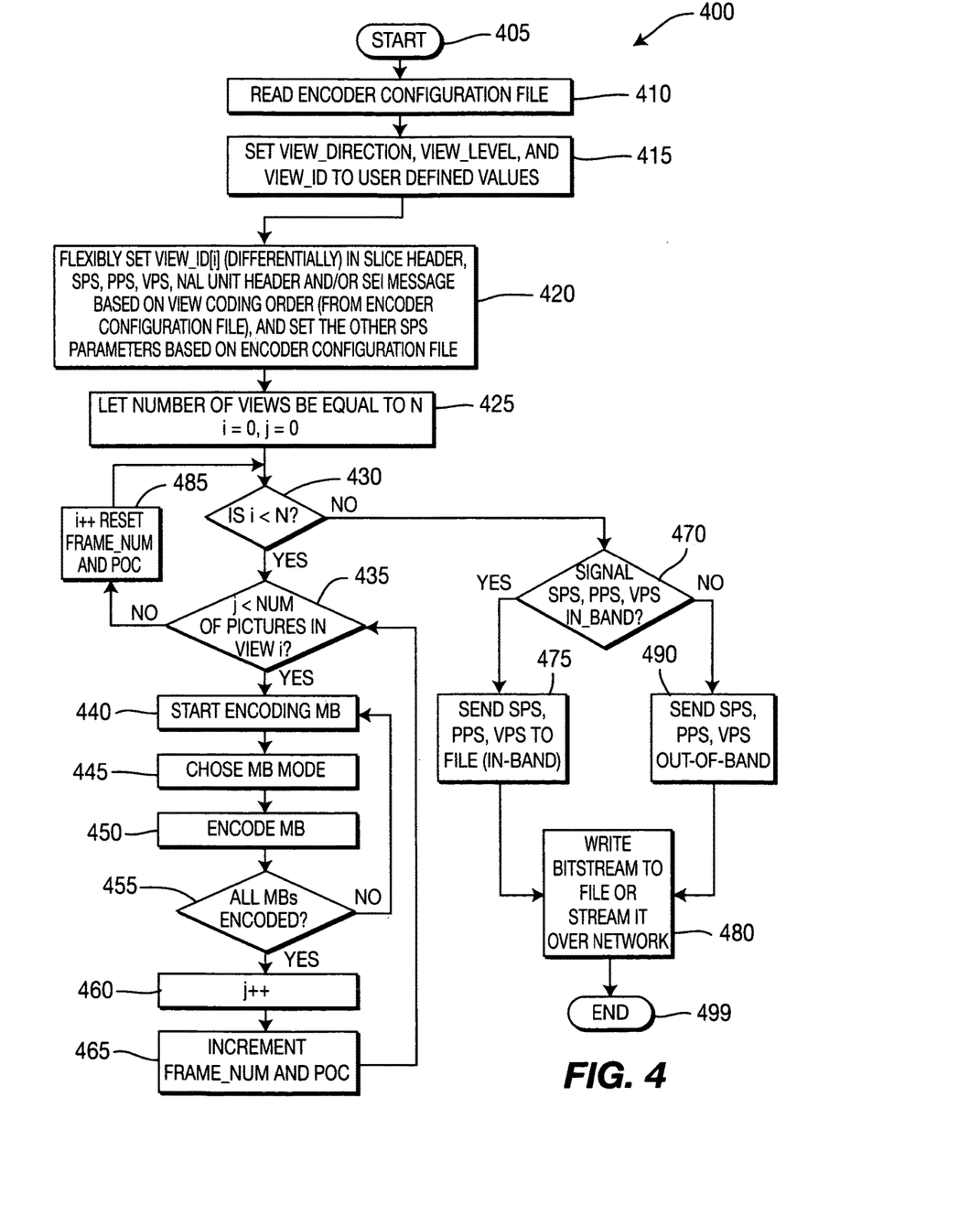
FIG. 4 is a flow diagram for an exemplary method for encoding multi-view video content, in accordance with an embodiment of the present principles.

Turning to FIG. 4, an exemplary method for encoding multi-view video content is indicated generally by the reference numeral 400.

The method 400 includes a start block 405 that passes control to a function block 410. The function block 410 reads the encoder configuration file, and passes control to a function block 415. The function block 415 sets view_direction, view_level, and view_id to user defined values, and passes control to a function block 420. The function block 420 flexibly sets view_id[i] (differentially) in the slice header, the sequence parameter set (SPS), the picture parameter set (PPS), the view parameter set (VPS), the network abstraction layer (NAL) unit header, and/or in a supplemental enhancement information (SEI) message, based on view coding order (from the encoder configuration file), sets the other sequence parameter set parameters based on the encoder configuration file, and passes control to a function block 425. The function block 425 lets the number of views be equal to a variable N, initializes a variable i and a variable j both to zero, and passes control to a decision block 430. The decision block 430 determines whether or not i is less than N. If so, then control is passed to a function block 435. Otherwise, control is passed to a function block 485.

The decision block 435 determines whether or not j is less than the number of pictures in view i. If so, then control is passed to a function block 440. Otherwise, control is passed to the function block 485.

The function block 440 starts encoding the current macroblock (MB), and passes control to a function block 445. The function block 445 chooses the macroblock mode, and passes control to a function block 450. The function block 450 encode the current macroblock, and passes control to a decision block 455. The decision block 455 determines whether or not all macroblocks have been encoded. If so, then control is passed to a function block 460. Otherwise, control is returned to the function block 440.

The function block 460 increments the variable j, and passes control to a function block 465. The function block 465 increments frame_num and picture order count (POC), and passes control to a decision block 470. The decision block 470 determines whether or not to signal the sequence parameter set (SPS) and/or the picture parameter set (PPS) in-band. If so, the control is passed to a function block 475. Otherwise, control is passed to a function block 490.

The function block 475 sends the sequence parameter set (SPS), the picture parameter set (PPS), and/or the view parameter set (VPS) to a file (i.e., in-band), and passes control to a function block 480. The function block 480 writes the bitstream to a file or streams the bitstream over a network(s), and passes control to an end block 499.

The function block 485 increments the variable i, resets frame_num, and picture order count (POC), and returns control to the decision block 430.

The function block 490 sends the sequence parameters set (SPS), the picture parameter set (PPS), and/or the view parameter set (VPS) out-of-band, and passes control to the function block 480.

Figure 5:
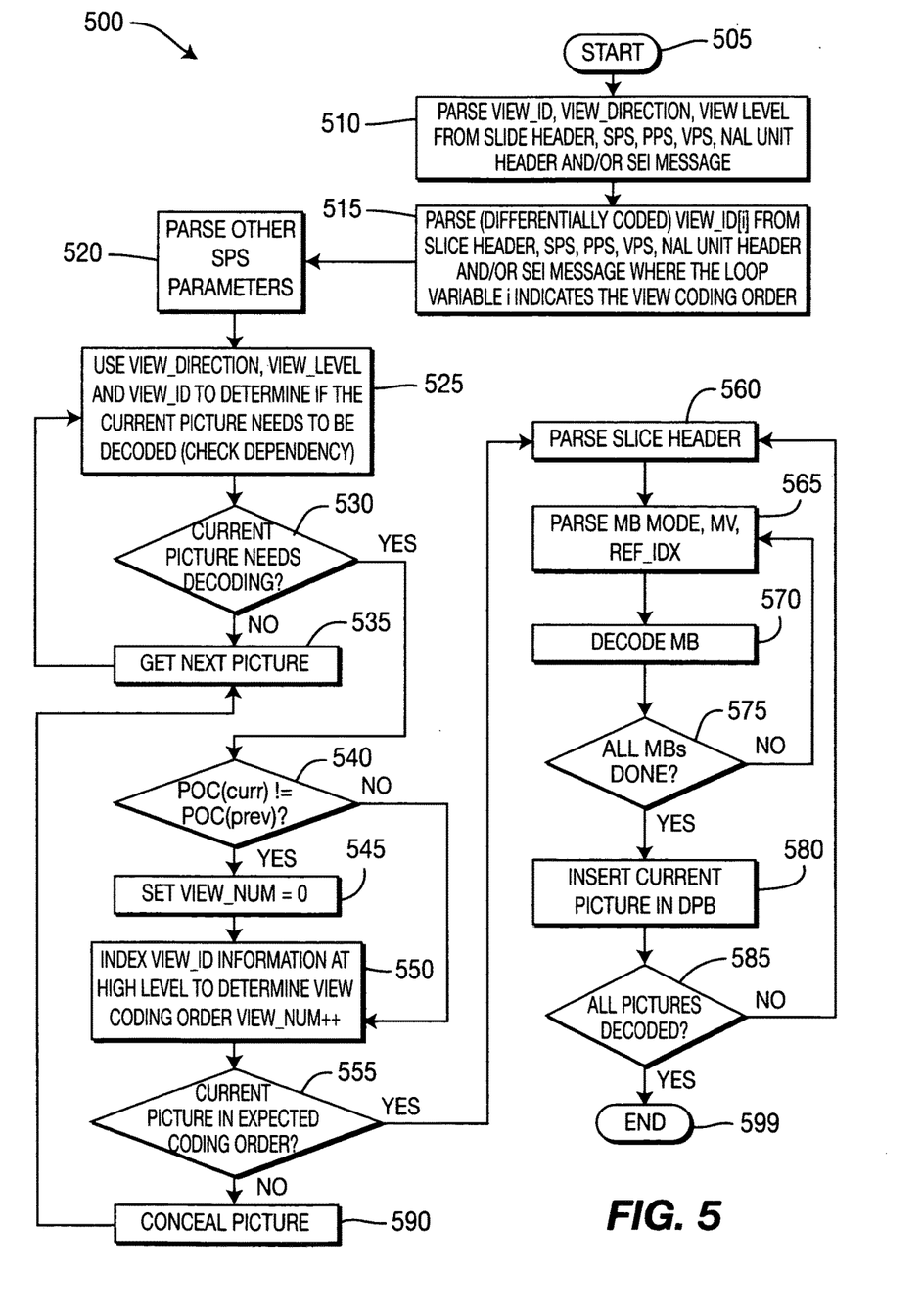
FIG. 5 is a flow diagram for another exemplary method for encoding multi-view video content, in accordance with an embodiment of the present principles.

Turning to FIG. 5, an exemplary method for decoding multi-view video content is indicated generally by the reference numeral 500.

The method 500 includes a start block 505 that passes control to a function block 510. The function block 510 parses view_id, view_direction, and view_level from either the slice header, the sequence parameter set (SPS), the picture parameter set (PPS), the view parameter set (VPS), the network abstraction layer (NAL) unit header, and/or a supplemental enhancement information (SEI) message, and passes control to a function block 515. The function block 515 parses (differentially coded) view_id[i] from the slice header, the sequence parameter set (SPS), the picture parameter set (PPS), the view parameter set (VPS), the network abstraction layer (NAL) unit header, and/or a supplemental enhancement information (SEI) message where the loop variable i indicates the view coding order, and passes control to a function block 520. The function block 520 parses other sequence parameter set parameters, and passes control to a function block 525. The function block 525 uses view_direction, view_level, and view_id to determine if the current picture needs to be decoded (check dependency), and passes control to a decision block 530. The decision block determines whether or not the current picture needs decoding. If so, then control is passed to a decision block 540. Otherwise, control is passed to a function block 535.

The function block 540 determines whether or not the picture order count (POC) of the current picture is equal to the picture order count (POC) of the previous picture, namely POC(curr)=POC(prev). If so, then control is passed to a function block 545. Otherwise, control is passed to a function block 550.

The function block 545 sets view_num equal to zero, and passes control to the function block 550. The function block 550 indexes the view_id information at the high level to determine the view coding order, increments view_num, and passes control to a decision block 555. The decision block 555 determines whether or not the current picture is in the expected coding order. If so, then control is passed to a function block 560. Otherwise, control is passed to a function block 590.

The function block 560 parses the slice header, and passes control to a function block 555. The function block 555 parses the macroblock (MB) mode, the motion vector (mv), and the reference index (ref_idx), and passes control to a function block 570. The function block 570 decodes the current macroblock, and passes control to a decision block 575. The decision block 575 determines whether or not all macroblocks have been decoded in the current picture. If so, then control is passed to a function block 580. Otherwise, control is returned to the function block 565.

The function block 580 inserts the current picture in the decoded picture buffer (DPB), and passes control to a decision block 585. The decision block 585 determines whether or not all pictures have been decoded. If so, then control is passed to an end block 599. Otherwise, control is returned to the function block 560.

The function block 590 conceals the current picture, and returns control to the function block 535.

A description will now be given regarding another embodiment of the present principles.

In the embodiment, we signal the view coding order explicitly in the bitstream. The view coding order information can be indicated in any high level syntax including, but not limited to, syntax at the slice header level, the sequence parameter set (SPS) level, the picture parameter set (PPS) level, the view parameter set (VPS) level, the network abstraction layer (NAL) unit header level, and in a supplemental enhancement information (SEI) message.

TABLE 3 shows the proposed sequence parameter set multi-view video coding (MVC) extension syntax in accordance with the embodiment. Thus, TABLE 3 illustrates the insertion of the view coding order for the current specification of the multi-view video coding (MVC) extension. This keeps the structure of the sequence parameter set design in the current specification of the multi-view video coding (MVC) extension, but adds view_num into the loop. This view_num signals the coding order.

TABLE 3

| seq_parameter_set_mvc_extension( ) { | C | Descriptor |
|---|---|---|
| num_views_minus_1 | | ue(v) |
| for(i = 0; i <= num_views_minus_1; i++) | | |
| view_num[i] | | ue(v) |
| for(i = 0; i <= num_views_minus_1; i++) { | | |
| num_anchor_refs_l0[i] | | ue(v) |
| for( j = 0; j < num_anchor_refs_l0[i]; j++ ) | | |
| anchor_ref_l0[i][j] | | ue(v) |
| num_anchor_refs_l1[i] | | ue(v) |
| for( j = 0; j < num_anchor_refs_l1[i]; j++ ) | | |
| anchor_ref_l1[i][j] | | ue(v) |
| } | | |
| for(i = 0; i <= num_views_minus_1; i++) { | | |
| num_non_anchor_refs_l0[i] | | ue(v) |
| for( j = 0; j < num_non_anchor_refs_l0[i]; j++ ) | | |
| non_anchor_ref_l0[i][j] | | ue(v) |
| num_non_anchor_refs_l1[i] | | ue(v) |
| for( j = 0; j < num_non_anchor_refs_l1[i]; j++ ) | | |
| non_anchor_ref_l1[i][j] | | ue(v) |
| } | | |
| } | | |

The newly added semantics are defined as follows:
view_num[i] specifies view coding order of view_id equal to i. view_num shall be incremented by one for each coded view in the coding order.

For the example of FIG. 3, the view_id is assigned incrementally from the top downward. The view_num is assigned based on view coding order as:

| | view_id | | | | | | | |
|---|---|---|---|---|---|---|---|---|
| | 0 | 1 | 2 | 3 | 4 | 5 | 6 | 7 |
| view_num | 0 | 2 | 1 | 4 | 3 | 6 | 5 | 7 |

We note that in the current design, we code an inter-view reference for the current view using absolute view_id as opposed to the difference between the current view_id and the reference view_id. Since in most cases the reasonable inter-view reference should be the view which is closer to the current view, we can code the difference between the current view_id and the inter-view reference view_id.

Application for Error Detection:

One example that involves the use of the proposed view_num to detect a lost picture is as follows. In time-first coding, at time instance T8, we receive a packet in order of view_id, 0 1 4 3 5 7. After we receive view_id 0 and view_id 1, we know view_id 2 is lost, because view_id 2 should be received before view_id 1. Then, we get view_id 4, 3, and 5, and we know view_id 6 is lost, since view_id 6 should be received before view_id 5.

We can determine whether the missing picture in view_id 2 and view_id 6 is lost due to transmission error or if it is intentionally missing if we use the syntax example in TABLE 3. Thus, if we want to intentionally not code certain views, we do not need to put the un-coded view_ids into the sequence parameter set.

Figure 6:
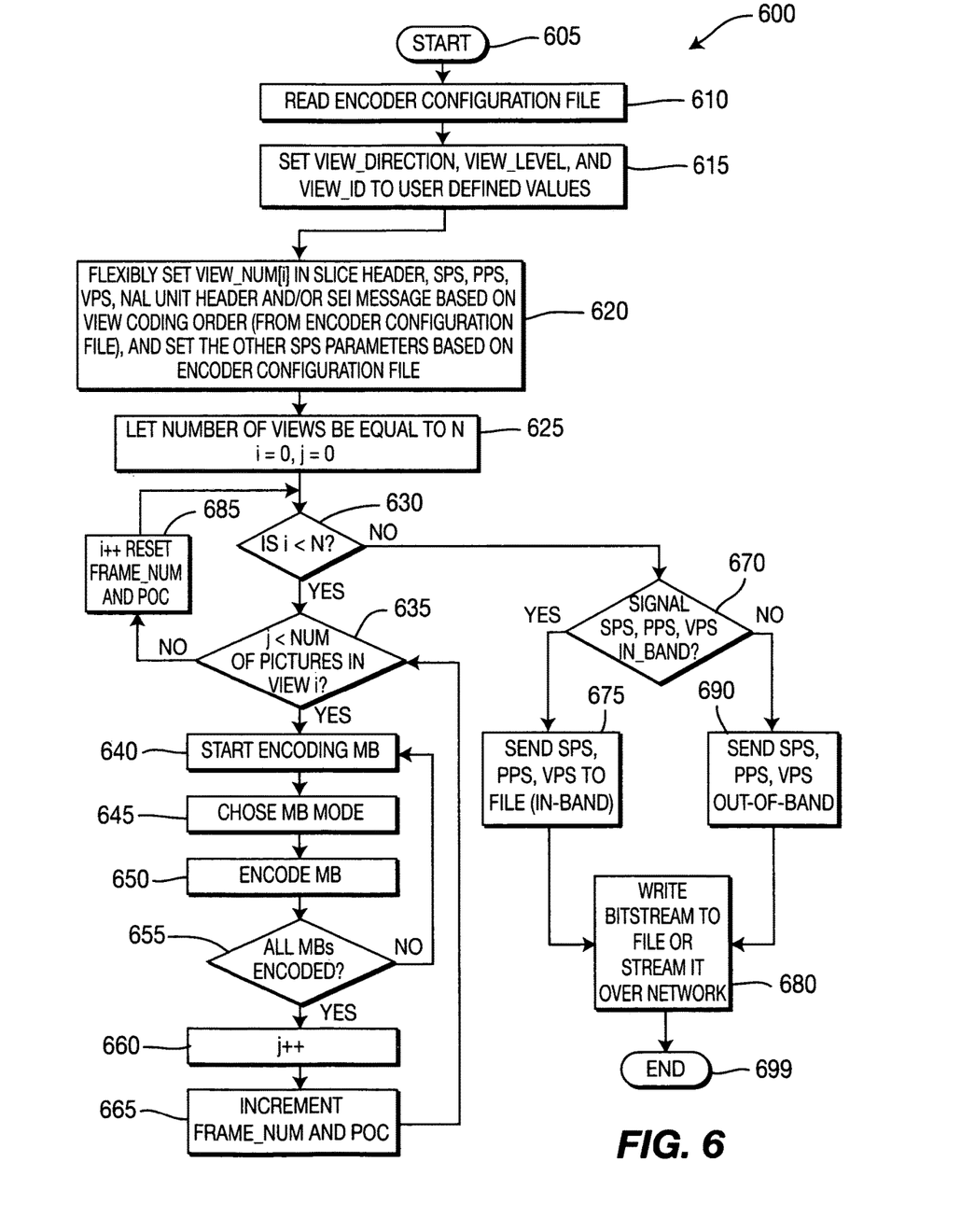
FIG. 6 is a flow diagram for an exemplary method for decoding multi-view video content, in accordance with an embodiment of the present principles.

Turning to FIG. 6, another exemplary method for encoding multi-view video content is indicated generally by the reference numeral 600.

The method 600 includes a start block 605 that passes control to a function block 610. The function block 610 reads the encoder configuration file, and passes control to a function block 615. The function block 615 sets view_direction, view_level, and view_id to user defined values, and passes control to a function block 620. The function block 620 flexibly sets view_num[i] in the slice header, the sequence parameter set (SPS), the picture parameter set (PPS), the view parameter set (VPS), the network abstraction layer (NAL) unit header, and/or in a supplemental enhancement information (SEI) message, based on view coding order for view_id i (from the encoder configuration file), sets the other sequence parameter set parameters based on the encoder configuration file, and passes control to a function block 625. The function block 625 lets the number of views be equal to a variable N, initializes a variable i and a variable j both to zero, and passes control to a decision block 630. The decision block 630 determines whether or not i is less than N. If so, then control is passed to a function block 635. Otherwise, control is passed to a function block 685.

The decision block 635 determines whether or not j is less than the number of pictures in view i. If so, then control is passed to a function block 640. Otherwise, control is passed to the function block 685.

The function block 640 starts encoding the current macroblock (MB), and passes control to a function block 645. The function block 645 chooses the macroblock mode, and passes control to a function block 650. The function block 650 encode the current macroblock, and passes control to a decision block 655. The decision block 655 determines whether or not all macroblocks have been encoded. If so, then control is passed to a function block 660. Otherwise, control is returned to the function block 640.

The function block 660 increments the variable j, and passes control to a function block 665. The function block 665 increments frame_num and picture order count (POC), and passes control to a decision block 670. The decision block 670 determines whether or not to signal the sequence parameter set (SPS) and/or the picture parameter set (PPS) in-band. If so, the control is passed to a function block 675. Otherwise, control is passed to a function block 690.

The function block 675 sends the sequence parameter set (SPS), the picture parameter set (PPS), and/or the view parameter set (VPS) to a file (i.e., in-band), and passes control to a function block 680. The function block 680 writes the bitstream to a file or streams the bitstream over a network(s), and passes control to an end block 699.

The function block 685 increments the variable i, resets frame_num, and picture order count (POC), and returns control to the decision block 630.

The function block 690 sends the sequence parameters set (SPS), the picture parameter set (PPS), and/or the view parameter set (VPS) out-of-band, and passes control to the function block 680.

Figure 7:
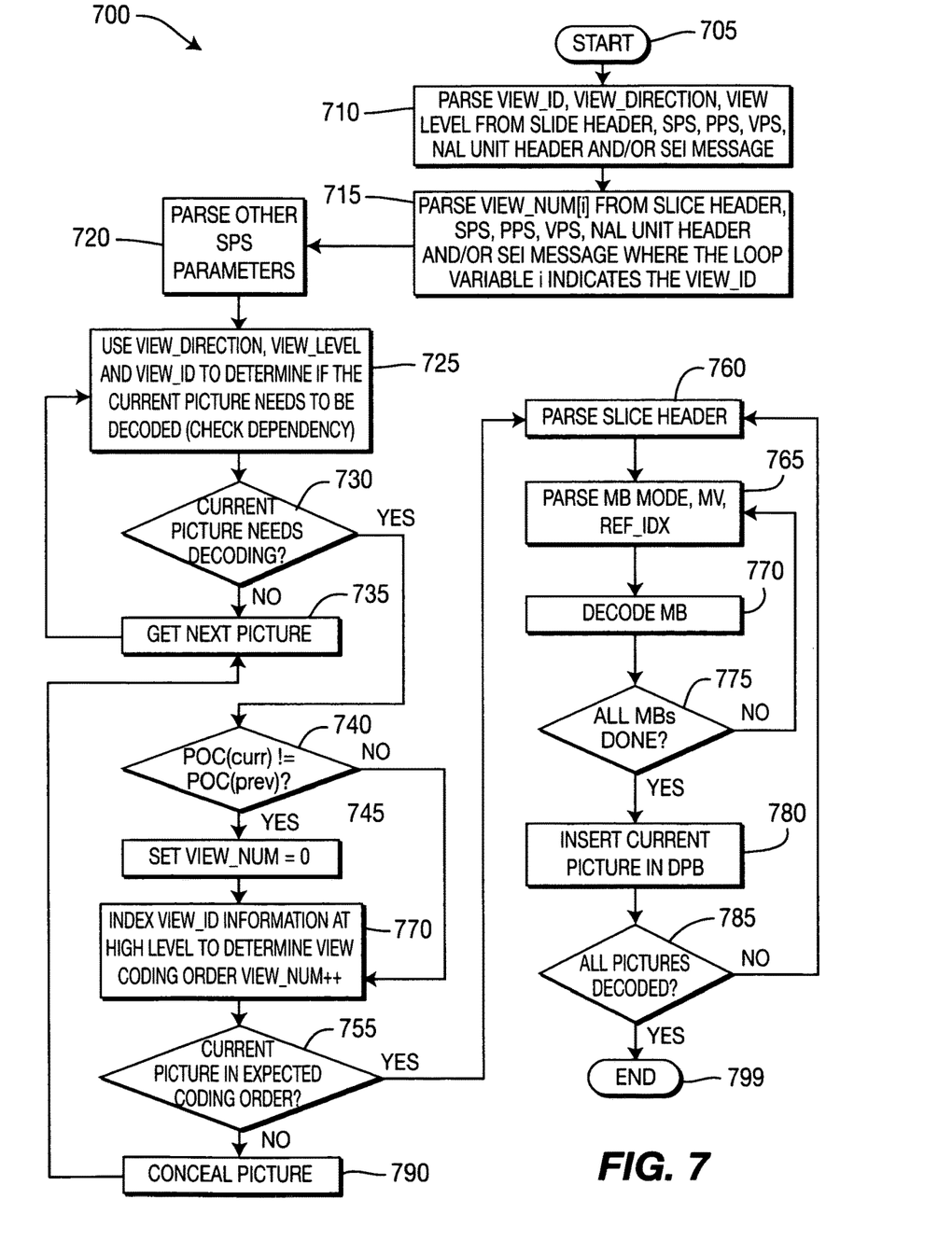
FIG. 7 is a flow diagram for another exemplary method for decoding multi-view video content, in accordance with an embodiment of the present principles.

Turning to FIG. 7, an exemplary method for decoding multi-view video content is indicated generally by the reference numeral 700.

The method 600 includes a start block 705 that passes control to a function block 710. The function block 710 parses view_id, view_direction, and view_level from either the slice header, the sequence parameter set (SPS), the picture parameter set (PPS), the view parameter set (VPS), the network abstraction layer (NAL) unit header, and/or a supplemental enhancement information (SEI) message, and passes control to a function block 715. The function block 715 parses view_num[i] from the slice header, the sequence parameter set (SPS), the picture parameter set (PPS), the view parameter set (VPS), the network abstraction layer (NAL) unit header, and/or a supplemental enhancement information (SEI) message where the loop variable i indicates the view_id, and passes control to a function block 720. The function block 720 parses other sequence parameter set parameters, and passes control to a function block 725. The function block 725 uses view_direction, view_level, and view_id to determine if the current picture needs to be decoded (check dependency), and passes control to a decision block 730. The decision block determines whether or not the current picture needs decoding. If so, then control is passed to a decision block 740. Otherwise, control is passed to a function block 735.

The function block 740 determines whether or not the picture order count (POC) of the current picture is equal to the picture order count (POC) of the previous picture, namely POC(curr)=POC(prev). If so, then control is passed to a function block 745. Otherwise, control is passed to a function block 750.

The function block 745 sets view_num equal to zero, and passes control to the function block 750. The function block 750 indexes the view_id information at the high level to determine the view coding order, increments view_num, and passes control to a decision block 755. The decision block 755 determines whether or not the current picture is in the expected coding order. If so, then control is passed to a function block 760. Otherwise, control is passed to a function block 790.

The function block 760 parses the slice header, and passes control to a function block 755. The function block 755 parses the macroblock (MB) mode, the motion vector (mv), and the reference index (ref_idx), and passes control to a function block 770. The function block 770 decodes the current macroblock, and passes control to a decision block 775. The decision block 775 determines whether or not all macroblocks have been decoded in the current picture. If so, then control is passed to a function block 780. Otherwise, control is returned to the function block 765.

The function block 780 inserts the current picture in the decoded picture buffer (DPB), and passes control to a decision block 785. The decision block 785 determines whether or not all pictures have been decoded. If so, then control is passed to an end block 799. Otherwise, control is returned to the function block 760.

The function block 790 conceals the current picture, and returns control to the function block 735.

A description will now be given of some of the many attendant advantages/features of the present invention, some of which have been mentioned above. For example, one advantage/feature is an apparatus having an encoder for encoding at least one picture for at least one view corresponding to multi-view video content in a resultant bitstream, wherein the encoder signals video coding order information for at least the at least one picture in a high level syntax.

Another advantage/feature is the apparatus having the encoder as described above, wherein the high level syntax element is included in at least one of a Sequence Parameter Set, a Picture Parameter Set, a View Parameter Set, a Supplemental Enhancement Information message, a slice header, and a Network Abstraction Layer unit header.

Yet another advantage/feature is the apparatus having the encoder as described above, wherein the multi-view video content corresponds to at least two views, including the at least one view, and, said encoder signals the view coding order information in the high level syntax by performing a plurality of iterations to loop through a view identifier in the high level syntax for each of the at least two views in coding order.

Moreover, another advantage/feature is the apparatus having the encoder as described above, wherein the multi-view video content corresponds to at least two views, including the at least one view, and, said encoder signals the view coding order information in the high level syntax by performing a plurality of iterations to loop through a view coding order in the high level syntax for each of the at least two views.

Further, another advantage/feature is the apparatus having the encoder as described above, wherein the high level syntax is signaled at least one of in-band and out-of-band.

Also, another advantage/feature is the apparatus having the encoder as described above, wherein said encoder differentially codes a view identifier for an inter-view reference picture used to encode the at least one picture, when said encoder encodes view dependency information for the at least one picture.

Additionally, another advantage/feature is the apparatus having the encoder as described above, wherein said encoder flexibly assigns a view identifier for the at least one view in another high level syntax.

Moreover, another advantage/feature is the apparatus having the encoder that flexibly assigns a view identifier for the at least one view in another high level syntax as described above, wherein the other high level syntax element is included in at least one of a Sequence Parameter Set, a Picture Parameter Set, a View Parameter Set, a Supplemental Enhancement Information message, a slice header, and a Network Abstraction Layer unit header.

Further, another advantage/feature is the apparatus having the encoder that flexibly assigns a view identifier for the at least one view in another high level syntax as described above, wherein the multi-view video content corresponds to at least two views, including the at least one view, and, said encoder flexibly assigns the view identifier for each of the at least two views in the other high level syntax by performing a plurality of iterations to loop through the view identifier in the other high level syntax for each of the at least two views in coding order.

Moreover, another advantage/feature is the apparatus having the encoder that performs the plurality of iterations to loop through the view identifier in the other high level syntax for each of the at least two views in coding order as described above, wherein the flexible assignment of the view identifier for each of the at least two views allows for gaps between consecutive view identifiers.

Also, another advantage/feature is the apparatus having the encoder that flexibly assigns a view identifier for the at least one view in another high level syntax as described above, wherein the multi-view video content corresponds to at least two views, including the at least one view, and, said encoder flexibly assigns the view identifier for each of the at least two views in the other high level syntax by performing a plurality of iterations to loop through a view coding order in the other high level syntax for each of the at least two views.

Additionally, another advantage/feature is the apparatus having the encoder that flexibly assigns a view identifier for the at least one view in another high level syntax as described above, wherein the other high level syntax is signaled at least one of in-band and out-of-band.

Moreover, another advantage/feature is the apparatus having the encoder as described above, wherein the encoder flexibly signals inter-view dependency information in the high level syntax.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. In a video decoder, a method for decoding multi-view video content, comprising:
    receiving a bitstream having said multi-view video content and high level syntax information;
    decoding a parameter, in said high level syntax information, representing a total number of coded views in the bitstream minus one;
    determining a view identifier and decoding order of a view within said multi-view video content from a parameter view_id[i] in said high level syntax information, wherein the decoding order of said view is indicated by the index i, and said view_id[i] explicitly signals said view identifier of said view within said multi-view video content, wherein index i ranges from 0 to the total number of coded views minus one, and wherein said view_id[i] is an index other than the index i;
    determining, using said decoding order as index, inter-view references needed for decoding said view; and
    decoding said view within said multi-view video content responsive to said decoding order and said inter-view references.

2. The method of claim 1, wherein the view identifier for each of a plurality of views of said multi-view video content is assigned such that gaps are allowed between consecutive view identifiers.

3. The method of claim 1, wherein the decoding order of said view is unique.

4. The method of claim 1, wherein the view represented by the view identifier view_id[i] is the ith view in the decoding order.

5. An apparatus, comprising:
    at least a memory and one or more processors coupled to said at least one memory, wherein the one or more processors are configured to:
    receive a bitstream having said multi-view video content and high level syntax information;
    decode a parameter, in said high level syntax information, representing a total number of coded views in the bitstream minus one;
    determine a view identifier and decoding order of a view within said multi-view video content from a parameter view_id[i] in said high level syntax information, wherein the decoding order of said view is indicated by the index i, and said view_id[i] explicitly signals said view identifier of said view within said multi-view video content, wherein index i ranges from 0 to the total number of coded views minus one, and wherein said view_id[i] is an index other than the index i;
    determine, using said decoding order as index, inter-view references needed for decoding said view; and
    decode said view within said multi-view video content responsive to said decoding order and said inter-view references.

6. The apparatus of claim 5, wherein the view identifier for each of a plurality of views of said multi-view video content is assigned such that gaps are allowed between consecutive view identifiers.

7. The apparatus of claim 5, wherein the decoding order of said view is unique.

8. The apparatus of claim 5, wherein the view represented by the view identifier view_id[i] is the ith view in the decoding order.

9. A non-transitory storage medium having thereon an encoded bitstream, the encoded bitstream comprising:
    an encoded picture section including an encoding of a view of multi-view video content;
    a first signaling section including an encoding of a parameter representing a total number of coded views in the bitstream minus one;
    a second signaling section including an encoding of a parameter view_id[i] in high level syntax information, wherein a view identifier and a decoding order of said view within said multi-view video content are indicated using said parameter view_id[i], wherein the decoding order of said view is indicated by the index i, and said view_id[i] explicitly signals a view identifier of said view within said multi-view video content, wherein index i ranges from 0 to the total number of coded views minus one, and wherein said view_id[i] is an index other than the index i; and a third signaling section including an encoding of parameters indicating inter-view references, using said decoding order as index, needed for decoding said view.

10. The storage medium of claim 9, wherein the view identifier for each of a plurality of views of said multi-view video content is assigned such that gaps are allowed between consecutive view identifiers.

11. The storage medium of claim 9, wherein the decoding order of said view is unique.

12. The storage medium of claim 9, wherein the view represented by the view identifier view_id[i] is the ith view in the decoding order.

* * * * *